US011099990B2

(12) United States Patent
Levinsky et al.

(10) Patent No.: US 11,099,990 B2
(45) Date of Patent: Aug. 24, 2021

(54) MANAGING SERIAL MISS REQUESTS FOR LOAD OPERATIONS IN A NON-COHERENT MEMORY SYSTEM

(71) Applicant: Apple Inc., Cupertino, CA (US)

(72) Inventors: Gideon N. Levinsky, Cedar Park, TX (US); Brian R. Mestan, Austin, TX (US); Deepak Limaye, Austin, TX (US); Mridul Agarwal, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/545,521

(22) Filed: Aug. 20, 2019

(65) Prior Publication Data
US 2021/0056024 A1   Feb. 25, 2021

(51) Int. Cl.
*G06F 12/0811* (2016.01)
(52) U.S. Cl.
CPC .. *G06F 12/0811* (2013.01); *G06F 2212/1021* (2013.01)
(58) Field of Classification Search
CPC .................................................. G06F 12/0811
See application file for complete search history.

(56) References Cited

U.S. PATENT DOCUMENTS

| 6,430,654 | B1 | 8/2002 | Mehrotra et al. | |
| 6,438,650 | B1* | 8/2002 | Quach | G06F 12/0859 711/100 |
| 10,037,211 | B2 | 7/2018 | Fernsler et al. | |
| 2007/0050564 | A1* | 3/2007 | Gunna | G06F 12/0831 711/146 |
| 2007/0067567 | A1* | 3/2007 | Jiao | G06F 12/0844 711/118 |
| 2007/0067572 | A1* | 3/2007 | Jiao | G06F 12/0859 711/125 |
| 2008/0086594 | A1* | 4/2008 | Chang | G06F 9/3826 711/118 |
| 2010/0030973 | A1* | 2/2010 | Speight | G06F 12/0862 711/137 |
| 2014/0052918 | A1* | 2/2014 | Khailany | G06F 12/0859 711/122 |

(Continued)

FOREIGN PATENT DOCUMENTS

CN          103399824 A       11/2013

*Primary Examiner* — Edward J Dudek, Jr.
(74) *Attorney, Agent, or Firm* — Kowert Hood Munyon Rankin and Goetzel PC; Rory D. Rankin

(57) ABSTRACT

A system and method for efficiently forwarding cache misses to another level of the cache hierarchy. Logic in a cache controller receives a first non-cacheable load miss request and stores it in a miss queue. When the logic determines the target address of the first load miss request is within a target address range of an older pending second load miss request stored in the miss queue with an open merge window, the logic merges the two requests into a single merged miss request. Additional requests may be similarly merged. The logic issues the merged miss requests based on determining the merge window has closed. The logic further prevents any other load miss requests, which were not previously merged in the merged miss request before it was issued, from obtaining a copy of data from the returned fill data. Such prevention in a non-coherent memory computing system supports memory ordering.

20 Claims, 10 Drawing Sheets

(56) References Cited

U.S. PATENT DOCUMENTS

2014/0317356 A1* 10/2014 Srinivasan .......... G06F 12/0844
  711/137
2017/0277542 A1* 9/2017 Fernsler ................ G06F 9/3851
2018/0024929 A1* 1/2018 Greiner ............... G06F 12/0862
  711/137

* cited by examiner

MANAGING SERIAL MISS REQUESTS FOR LOAD OPERATIONS IN A NON-COHERENT MEMORY SYSTEM

BACKGROUND

Technical Field

Embodiments described herein relate to the field of computing systems and, more particularly, to efficiently forwarding cache misses to another level of the hierarchy.

Description of the Related Art

Generally speaking, a variety of computing systems include multiple processors and a memory, and the processors generate access requests for instructions and application data while processing software applications. The processors include a central processing unit (CPU), data parallel processors like graphics processing units (GPUs), digital signal processors (DSPs), multimedia engines, and so forth. Computing systems often include two or three levels of cache hierarchy for the multiple processors. Later levels in the hierarchy of the system memory include access via a memory controller to system memory. Data from recently accessed memory locations are stored within the caches. When the data is requested again, the data is sent to a cache controller to retrieve the requested data from a cache rather than from system memory.

In some designs, requested data includes attributes such as a cacheable/non-cacheable attribute. When a memory access operation, such as a load request, requests non-cacheable data, the cache access results in a cache miss. In some designs, the cache miss is determined based on the non-cacheable attribute before any cache access is actually performed. Logic in a load/store unit (LSU) or a cache controller detects the non-cacheable attribute and sends the non-cacheable load request to a miss queue. Logic associated with the miss queue issues the load miss request to a lower level of the cache memory hierarchy. Because requests for non-cacheable data will invariably miss in the cache, it is necessary to retrieve requested data from system memory each and every time such a request is made if the system does not support merging of miss requests as described herein. Consequently, performance of the system may be seriously impacted in the absence of such merging.

In some cases, an issued load miss request targets data within an address range of one or more other load miss requests. In some designs, the target address range corresponds to a cache line of a cache in the lower level of the cache memory hierarchy. In some computing systems operating with a non-coherent memory system, the logic of the miss queue does not merge load miss requests targeting a same address range. While this approach may ensure a proper memory ordering/consistency model of a given architecture is preserved, it also suffers from the performance impact issues noted above. While merging can address performance issues, it is nevertheless important that the merging approach taken continues to maintain the memory ordering/consistency model of the architecture.

In view of the above, efficient methods and mechanisms for efficiently processing cache misses in a computing system are desired.

SUMMARY

Systems and methods for efficiently forwarding cache misses to another level of the hierarchy are contemplated. In various embodiments, a computing system includes a memory and a processor. The computing system also includes a cache memory hierarchy with a level-one (L1) cache being at the highest level in the cache memory hierarchy and directly connected to the processor. A level-two (L2) cache is one level lower than the L1 cache in the cache memory hierarchy. A level-three (L3) cache, or system memory if there is no L3 cache, is one level lower than the L2 cache in the cache memory hierarchy. A cache controller at any one of the levels of the cache memory hierarchy includes a first interface for communicating with access logic of a cache and a second interface for communicating with a lower level of the cache memory hierarchy. The cache controller also includes a miss queue with queue entries for storing information of non-cacheable load miss requests. When logic of the cache controller determines a first load request has attributes indicating that the load request is non-cacheable, the logic determines that requested data is not stored in the cache and stores the corresponding first non-cacheable load miss request in a queue entry of the miss queue.

The logic of the cache controller supports merging two or more non-cacheable load miss requests targeting a same address range into a single merged miss request. In this manner, multiple non-cacheable load miss requests targeting the same address range are serviced by a single cache fill. In some embodiments, the address range corresponds to a cache line of the lower level of the cache memory hierarchy. In an embodiment, a new merge window opens when the miss queue receives a non-cacheable load miss request that has a target address within an address range not yet associated with an open merge window. In various embodiments, the logic of the cache controller permits multiple non-cacheable load miss requests to merge while the merge window for an associated address range is "open."

In addition to merging the first load miss request with the second load miss request into the single merged miss request, the logic updates a size of the corresponding merged miss request. For example, in an embodiment, the logic updates the size of the merged miss request based on a request data size of the first load miss request. In some embodiments, the size of the merged miss request is updated by a size of request data of the first load miss request that does not overlap with request data of the second load miss request or any other load miss requests already merged with the second load miss request.

Based on one or more conditions, the logic ends merging load miss requests for the address range and "closes" the corresponding merge window. In an embodiment, the logic updates a status field associated with the address range of the merge window to indicate that the merge window is closed. When a merge window is closed, the logic no longer merges load miss requests with a single merged miss request associated with the merge window. Although the single merged miss requests may not have yet been issued, the logic still prevents further merging with the single merged miss request.

An example of a first condition used to close a merge window is a timer for the address range of the merge window has reached a time threshold, or has measured that a threshold amount of time has elapsed. An example of a second condition is a number of load miss requests that have merged with the second load miss request has reached a threshold number. An example of a third condition is the size of the merged miss request has reached a maximum size threshold. In one embodiment, one or more of the thresholds are stored in programmable configuration registers.

In an embodiment, the maximum size threshold is the size of a cache line of the lower level of the cache memory hierarchy. In another embodiment, the maximum size threshold is the accumulated size of the threshold number of load miss requests merged in the single merged miss request. In an embodiment, a lower size threshold is selected with a value less than the maximum size threshold. For example, in an embodiment, the lower size threshold is stored in a programmable register with an initial value of 20 percent of the maximum size threshold. Other values of the lower size threshold are possible and contemplated. The logic issues the single merged miss request for at least the first load miss request and the second load miss request.

In some embodiments, the logic of the cache controller does not update the one or more thresholds for the time duration, size of requests, and so on, used for closing the merge window. Therefore, when a subsequent merge window opens for the same address range, the same thresholds are used for determining when to close the subsequent merge window. In other embodiments, the logic updates the thresholds. In some embodiments, the logic updates the thresholds after fill data returns to service the corresponding multiple load miss requests. In one embodiment, when the logic determines the first size of the merged miss request after issuing the merged miss request is less than a lower size threshold, the logic increases an initial duration of the timer corresponding to the address range of the merged miss request. In some embodiments, the logic increases the initial duration of the timer when further determining one or more non-cacheable load miss requests with a target address within the address range are stored in the miss queue within a time period after the merged miss request is issued. In one embodiment, the time period is based on a point in time when fill data for the issued merged miss request returns.

In an embodiment, an upper size threshold is selected with a value less than the maximum size threshold. For example, in an embodiment, the upper size threshold is stored in a programmable register with an initial value of 80 percent of the maximum size threshold. Other values of the upper size threshold are possible and contemplated. When the logic determines the first size of the merged miss request after issuing the merged miss request reaches the upper size threshold, the logic decreases the initial duration of the timer corresponding to an address range of the merged miss request. In an embodiment, the logic decreases the initial duration of the timer when further determining that no non-cacheable load miss requests with an address within the address range are stored in the miss queue within a time period after the merged miss request is issued.

These and other embodiments will be further appreciated upon reference to the following description and drawings.

BRIEF DESCRIPTION OF THE DRAWINGS

The above and further advantages of the methods and mechanisms may be better understood by referring to the following description in conjunction with the accompanying drawings, in which.

Figure 1:
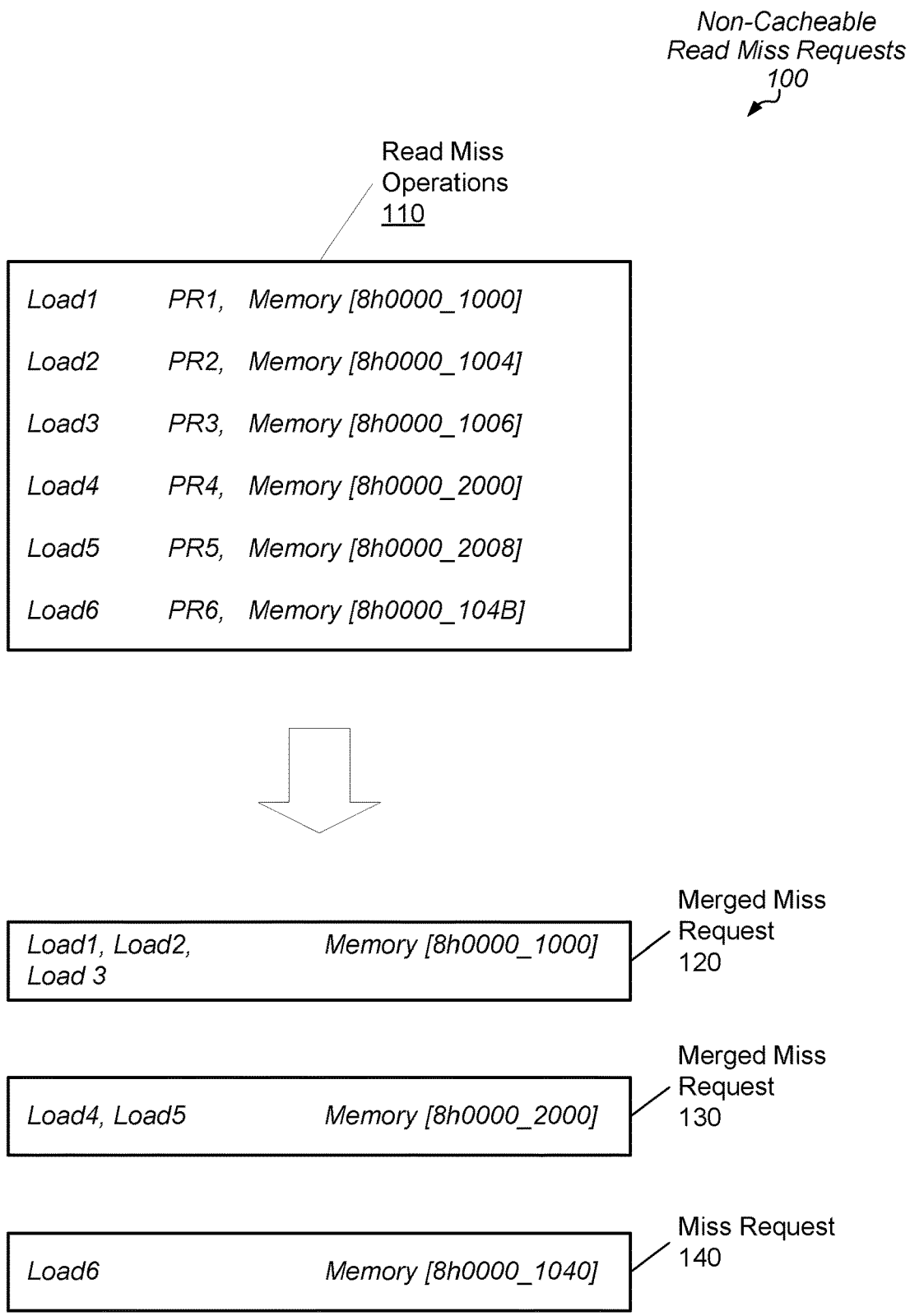
FIG. 1 is a block diagram of one embodiment of a series of non-cacheable read miss requests.

While the embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) for that unit/circuit/component.

DETAILED DESCRIPTION OF EMBODIMENTS

In the following description, numerous specific details are set forth to provide a thorough understanding of the embodiments described in this disclosure. However, one having ordinary skill in the art should recognize that the embodiments might be practiced without these specific details. In some instances, well-known circuits, structures, and techniques have not been shown in detail for ease of illustration and to avoid obscuring the description of the embodiments.

Turning now to FIG. 1, a block diagram illustrating one embodiment of non-cacheable load miss requests 100 is shown. In various embodiments, the read miss operations 110 include six read memory access operations in program order that missed in a cache. As used herein, a "memory access operation" is also referred to as a "memory access request" or a "memory request." Similarly, as used herein, a "read request" is also referred to as a "load request," and a "read miss request" is also referred to as a "load miss request." As shown, the read miss operations 110 includes six load requests labeled "Load1" to "Load6." In the illustrated embodiment, the load request "Load1" has a destination register identifier "PR1," and requests data from a memory location pointed to by the address "8h0000_1000." Here, the notation "8h" is used to indicate a hexadecimal representation of a value, and the value includes 8 hexadecimal digits. In this case, the address includes 8 hexadecimal digits, or 32 bits. In other embodiments, another number of bits is used for the addresses.

In some embodiments, each of the load requests "Load1" to "Load6" requests data of a same size. In other embodiments, one or more of the load requests "Load1" to "Load6" requests data of a different size than others of the load requests "Load1" to "Load6." Although not shown, in one embodiment, the data size is indicated in the load request such as in an opcode or an operand. In various embodiments, a processor includes a map unit or other logic for mapping decoded instructions (or micro-ops, or uops) to physical registers within the processor. This mapping implements register renaming, which renames the architectural register identifiers of source operands to physical register identifiers. For example, in some embodiments, the instructions set architecture (ISA) supports 32 architectural registers, whereas, the processor that supports out-of-order execution has a hundred or more physical registers. Similarly, the map unit or other logic renames the architectural register identifiers of destination operands to physical register identifiers. The load request "Load1" includes the destination operand indicated by physical register 1, or "PR1." The load request "Load2" includes the destination operand indicated by physical register 2, or "PR2," and so on.

In various embodiments, each of these six load requests "Load1" to "Load6" has an associated non-cacheable attribute. In some embodiments, a load/store unit (LSU) receives the issued load requests, and accesses a translation lookaside buffer (TLB) to retrieve a corresponding address mapping. For example, the load request uses a virtual (linear) address, and the LSU accesses the TLB to obtain a corresponding physical address. In addition, the selected TLB entry provides attributes for the virtual address in addition to the physical address. In some embodiments, one of the attributes retrieved from the selected TLB entry includes an indication of whether the requested data is cacheable or non-cacheable. If the virtual address is marked as non-cacheable by the retrieved attributes, then one of the LSU and the cache controller sends the physical address of the load request and an indication of a non-cacheable access to a miss queue (not shown).

In some embodiments, the address range corresponds to the largest size of a single cache access (e.g., a cache line) of a cache in the lower level of the cache memory hierarchy. For example, when the cache line has a size of 64 bytes, one example of the address range is from 8h0000_1000 to 8h0000_103F. In the illustrated embodiment, each of the first three load requests "Load1" to "Load3" target a same cache line for requested data such as the cache line with bytes from 8h0000_1000 to 8h0000_103F. Similarly, each of the fourth and fifth load requests "Load4" and "Load5" target a same cache line for requested data such as the cache line with bytes from 8h0000_2000 to 8h0000_203F. The sixth load request "Load6" is the only load request of the group of six load requests to target a separate cache line from the others. For example, "Load6" targets the cache line with bytes from 8h0000_1040 to 8h0000_107F.

Rather than send six separate miss requests, in various embodiments, logic for the miss queue merges load requests targeting a same cache line for requested data. For example, based on the addresses, the logic merges the load requests "Load1" to "Load3" into the merged miss request 120, which accesses the cache line located at the memory location pointed to by the address 8h0000_1000. In some embodiments, the merged miss request 120 returns the entire cache line. In other embodiments, the merged miss request 120 returns only the requested data targeted by the load requests "Load1" to "Load3." Similarly, the logic merges the load requests "Load4" to "Load5" into the merged miss request 130, which accesses the cache line located at the memory location pointed to by the address 8h0000_2000. Again, in some embodiments, the merged miss request 130 returns the entire cache line. In other embodiments, the merged miss request 130 returns only the requested data targeted by the load requests "Load4" to "Load5." The logic determines the load request "Load6" does not qualify to merge with any other load miss request and issues a separate miss request 140. As shown, the separate miss request 140 accesses the cache line located at the memory location pointed to by the address 8h0000_1040. Alternatively, the logic issues the separate miss request 140 for only the requested data located at the memory location pointed to by the address 8h0000_104B.

Figure 2:
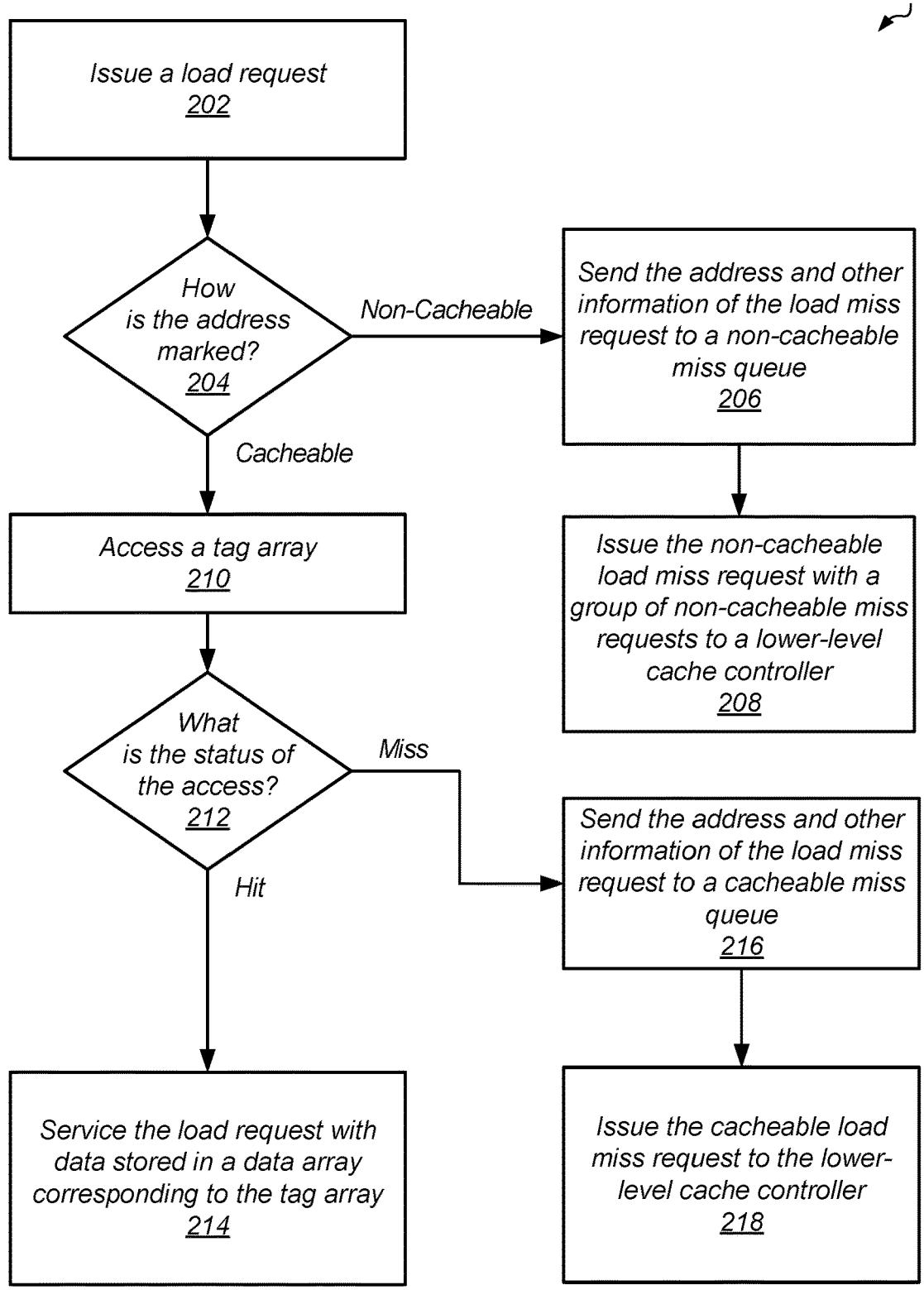
FIG. 2 is a flow diagram of one embodiment of a method for efficiently forwarding cache misses to another level of the hierarchy.

Turning now to FIG. 2, a generalized flow diagram of one embodiment of a method 200 for efficiently forwarding cache misses to another level of the cache memory hierarchy is shown. For purposes of discussion, the steps in this embodiment (as well as for FIGS. 5-8) are shown in sequential order. However, in other embodiments, some steps may occur in a different order than shown, some steps may be performed concurrently, some steps may be combined with other steps, and some steps may be absent.

Logic within a processor, such as an issue unit, issues a load request (block 202), and in some embodiments, a load/store unit (LSU) receives the issued load request. The LSU accesses a translation lookaside buffer (TLB) to retrieve a corresponding address mapping. For example, the memory access operation uses a virtual (linear) address, and the LSU accesses the TLB to obtain a corresponding physical address. In addition, the selected TLB entry provides attributes for the virtual address in addition to the physical address. One of the attributes retrieved from the selected TLB entry includes an indication of whether the requested data is cacheable or non-cacheable. It is noted that while in some embodiments attributes retrieved from a TLB entry indicate data corresponding to the request is non-cacheable, in other embodiments the received request itself may include an indication as to whether or not it is cacheable (e.g., one or more bits providing such an indication). If logic of the LSU or the cache controller determines requested data corresponding to the request is non-cacheable ("non-cacheable" branch of the conditional block 204), then logic of one of the LSU and a cache controller sends the physical address and other information of the load miss request and an indication of a non-cacheable access to a non-cacheable miss queue (block 206). Notably, in some embodiments, when it is determined that the target address corresponds to a non-cacheable address (space), a cache access corresponding to the received request is not performed. At a later time, logic associated with the non-cacheable miss queue issues the load miss request to a lower-level cache controller (block 208) or system memory. In some embodiments, prior to issuing the load miss request to lower-level memory, the logic merges the load miss request with one or more other load miss requests in a single merged miss request.

If the virtual address is marked as cacheable by the retrieved attributes ("cacheable" branch of the conditional block 204), then logic associated with the LSU conveys the load request to the cache controller which accesses a tag array (block 210). If the access results in a hit ("hit" branch of the conditional block 212), then the logic services the load request with data stored in a data array corresponding to the tag array (block 214). If the access results in a miss ("miss" branch of the conditional block 212), then logic sends the address and other information of the load miss request to a cacheable miss queue (block 216). At a later time, logic of the cacheable miss queue issues the load miss request to a lower-level cache controller (block 218).

Figure 3:
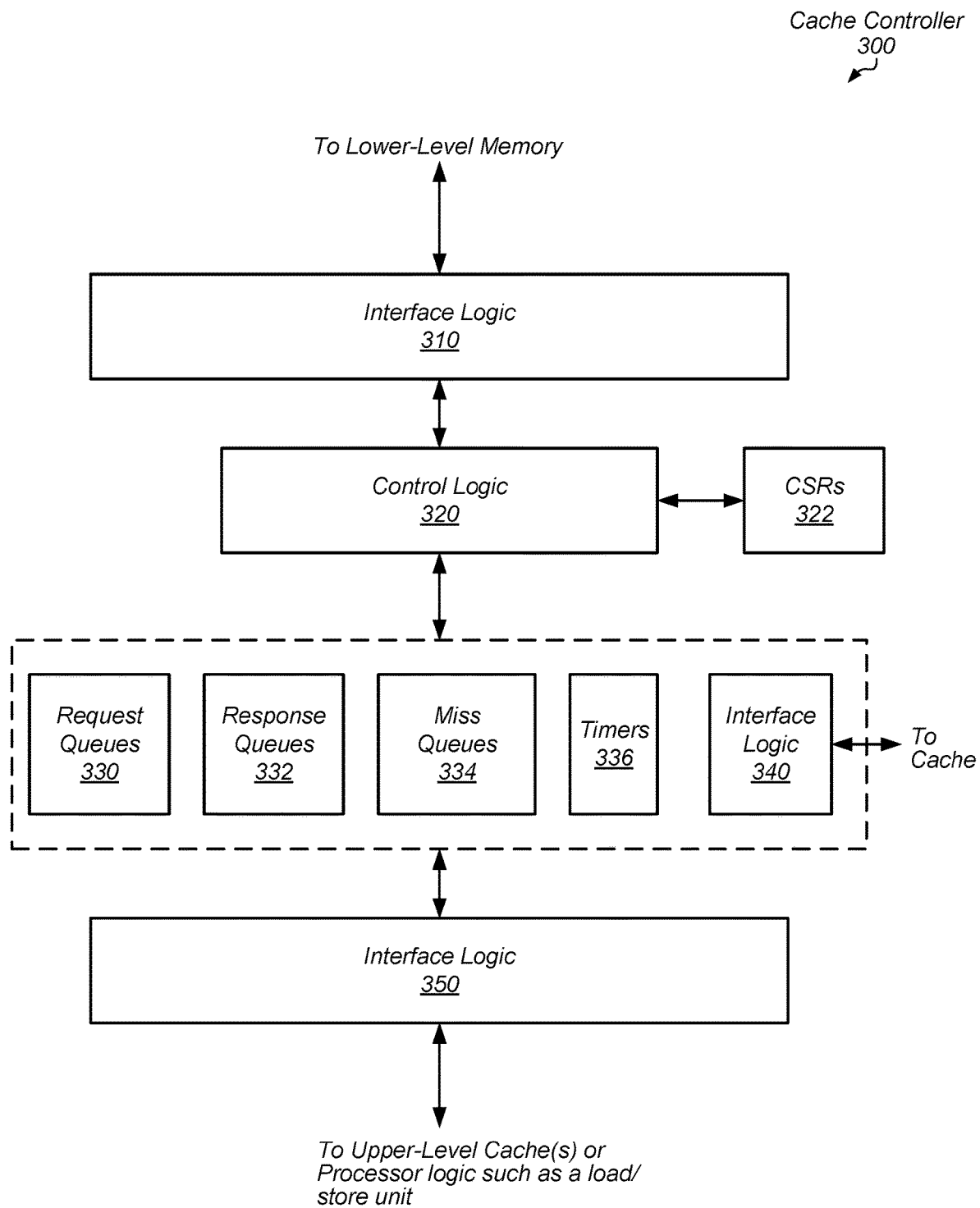
FIG. 3 is a block diagram of one embodiment of a cache controller.

Referring to FIG. 3, a generalized block diagram of one embodiment of a cache controller 300 is shown. The cache controller 300 includes interface logic 310 for communicating with off-chip memory such as system memory, and interface logic 350 for communicating with either an upper-level cache or a load/store unit (LSU) of a processor core depending on where in the cache memory hierarchy the cache controller 300 is placed. In one example, a level-one (L1) cache is at the highest level in the cache memory hierarchy, which is directly connected to the processor, and a level-two (L2) cache is one level lower from the L1 cache in the cache memory hierarchy. System memory is at the lowest level in the cache memory hierarchy. In an embodiment, the cache controller 300 is a L1 cache controller using interface logic 350 for interfacing with at least an LSU of a processor core and using interface logic 310 for interfacing with an L2 cache controller. In other embodiments, the cache controller 300 is a cache controller at another level of the cache memory hierarchy. Each of the interface logic 310 and 350 includes logic for supporting appropriate communication protocols and determining when to drive data on buses and when to receive data on buses.

The cache controller 300 also includes request queues 330 for storing received memory requests received from the interface logic 350. The response queues 332 store the read response data and write acknowledgments corresponding to memory requests stored in request queues 330 being serviced. In some embodiments, one or more of the request queues 330 and the response queues 332 are split into multiple queues based on one or more of a command type, a source of the request, and so on. The control logic 320 includes logic for assigning priorities to the memory requests and the memory responses, and scheduling when to deallocate them from the queues 330 and 332. In some embodiments, weights and priorities are stored in programmable registers within the configuration and status registers (CSRs 322). In various embodiments, the functionality of the control logic 320 and the interface logic 310, 340 and 30 are implemented in hardware, such as circuitry, in software, and in a combination of hardware and software.

The cache controller 300 supports accessing data stored in a cache memory in the cache memory hierarchy with interface logic 340. The interface logic 340 sends memory access requests to one or more of the external tag array and the data array when the control logic 320 selects memory access requests from the request queues 330. The interface logic 340 returns results of tag match operations, response data and write acknowledgments from the external cache to the one or more of the control logic 320 and the response queues 332. When memory access requests are not found in the cache, the miss queues 334 store the corresponding memory access requests as miss requests. Similar to the request queues 330 and the response queues 332, in some embodiments, the miss queues 334 are organized as separate queues based on one or more of command type, a cacheable and non-cacheable attribute, and so forth. In an embodiment, the miss queues 334 includes a miss queue for non-cacheable load miss requests.

In various embodiments, the control logic 320 is able to perform the steps described earlier for the non-cacheable load miss requests 100-300 and method 400, and additionally for the upcoming methods 700-1000 (of FIGS. 7-10). For example, in some embodiments, the timers 336 include a timer for a particular address range of non-cacheable load miss requests. A particular timer of the timers 336 for a particular address range maintains an initial value until a load miss request with a target address within the particular address range is allocated in the miss queues 334. At that time, the control logic 320 begins updating the particular timer.

In some embodiments, to update the timer, the control logic 320 increments the timer by a particular amount each clock cycle. Therefore, when a non-cacheable load miss request has a queue entry allocated in the miss queues 334, and the load miss request does not qualify to merge with any other pending load miss request stored in the miss queues 334, then the control logic 320 opens a merge window and begins updating a timer of the timers 336 each clock cycle. In other words, the load miss request is the initial load miss request stored in the miss queue for the open merge window.

In some embodiments, the timer begins at zero and the control logic 320 increments the timer by one each clock cycle until the value stored in the timer reaches a time threshold. In other embodiments, the timer of the timers 336 is initialized with a time threshold corresponding to a particular duration, and the control logic 320 decrements the timer by one each clock cycle until the value stored in the timer reaches zero. In yet other embodiments, the increment amount or the decrement amount, and the start and end values, of the timer use other values.

In some embodiments, the timers 336 are included in the CSRs 322. In other embodiments, the timers 336 are included near or with the miss queues 334. In addition to the timers, in an embodiment, the CSRs 322 include a set of registers, each register of the set allocated for a particular address range in the miss queues 334. When a non-cacheable load miss request has an entry allocated in the miss queues 334, a corresponding one of these registers in the set stores an indication of an amount of requested data for one or more load miss requests targeting the corresponding address range. When the control logic 320 determines the amount of requested data has reached a size threshold, further merging for a load miss is "closed," and at a later time, the control logic 320 issues a miss request corresponding to the merge window. Therefore, the opportunity to continue merging multiple load miss requests into a single merged miss request ends for the particular merge window.

If the control logic 320 determines that the amount of requested data has not reached the size threshold, possible merging remains "open" and the control logic 320 does not issue the miss request until the corresponding timer reaches a time threshold. For an issued single merged miss request, when the fill data returns, each of the multiple load miss requests corresponding to the single merged miss request obtains a copy of its requested data. In various embodiments, the control logic 320 prevents any other load miss requests, which were not previously merged in the single miss request before it was issued, from obtaining a copy of data from the returned fill data.

It is noted that the prevention of further merging once a merge window closes supports maintaining memory ordering of the load miss requests. In some embodiments, the cache controller 300 is used in a computing system supporting non-coherent memory. Consequently, the cache controller 300 receives no alerts or updates regarding when data has status updates. In such computing systems, permitting further merging with returned fill data after a corresponding merge window closed, rather than preventing further merging, creates opportunities for violating memory ordering models for the particular computer architecture.

In one embodiment, the control logic 320 no longer updates a timer of timers 336 for an address range once the timer has reached the time threshold. For example, the control logic 320 no longer increments or decrements the timer from an initial value. In an embodiment, the control logic 320 resets the timer to an initial value when the control logic 320 issues the single merged miss request targeting the address range. In yet another embodiment, the control logic 320 resets the timer at a later point in time. In one embodiment, the later point in time is measured by a time period. For example, once the control logic 320 issues the miss request, the control logic 320 updates a second timer separate from the timers 336 each clock cycle until the particular time period is reached. The CSRs 322 maintain this second timer in a programmable control register. Alternatively, the control logic 320 measures the time period using the timer of timers 336, which continues to be updated (incremented or decremented) each clock cycle despite having already reached the time threshold. In another embodiment, the later point in time is set by the point in time when the fill data for the miss request returns.

Once the later point in time is reached, the control logic 320 adjusts the initial value of the timer of the timers 336 based on whether one or more conditions are satisfied. A first condition is an amount of requested data for an issued merged miss request is less than a lower size threshold. A second condition is one or more subsequent load miss requests target the address range of the closed entry of the miss queues 334. In an embodiment, when the control logic 320 determines each of the first condition and the second condition is satisfied, the control logic 320 increases the duration of the timer by increasing its initial value. Therefore, for later merged miss requests targeting the same address range, the corresponding merge window is open for an extended amount of time (e.g., by adding additional time based on the difference between the original duration and the new longer duration). Consequently, the amount of data for the issued merged miss requests increases.

It is noted that the control logic 320 dynamically updates the merge window for the immediately next merged miss request targeting the same address range, since this subsequent merge window already began prior to the control logic 320 adjusting the initial value. In various embodiments, the initial value is stored in a programmable register of the CSRs 322. For example, if the timer decrements from the initial value to zero, then once the control logic 320 determines the adjusted initial value, the control logic 320 increases the timer of the currently open merge window by the difference between the original duration and the new longer duration minus one. For this particular clock cycle, the control logic 320 does not merely decrement the timer by one. After this particular clock cycle, the control logic 320 continues to decrement the timer by one.

In addition to the above first condition and second condition, once the later point in time is reached, the control logic 320 adjusts the initial value of the timer of the timers 336 based on a third condition and a fourth condition. The third condition is the amount of requested data of the merged miss request is between an upper size threshold and a maximum size threshold. The fourth condition is no subsequent load miss requests target the address range of the closed entry of the miss queues 334. In an embodiment, when the control logic 320 determines each of the third condition and the fourth condition is satisfied, the control logic 320 decreases the duration of the timer by decreasing its initial value. Therefore, for later merged miss requests targeting the same address range, the merge window for being open is reduced (e.g., by subtracting time based on the difference between the original duration and the new shorter duration). Similar to the above example, it is noted that the control logic 320 dynamically updates the merge window for the immediately next merged miss request targeting the same address range, since this merge window already began prior to the control logic 320 adjusting the initial value such as by decreasing the merge window.

Figure 4:
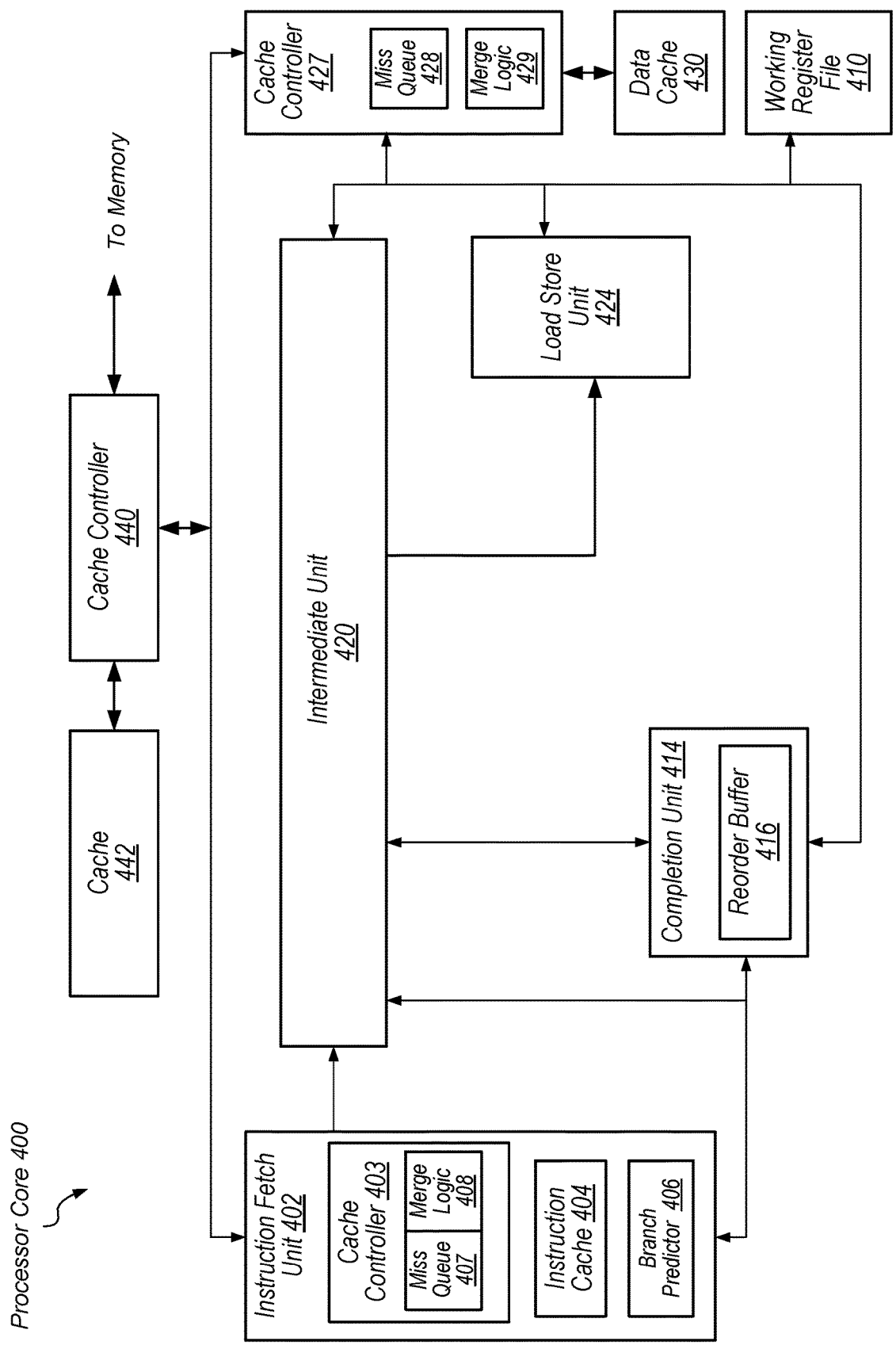
FIG. 4 is a block diagram of one embodiment of a processor core.

Turning now to FIG. 4, a block diagram illustrating one embodiment of a processor core 400 is shown. In various embodiments, the logic of processor core 400 is included in one or more cores of a central processing unit (CPU). Processor core 400 includes instruction fetch unit (IFU) 402. Fetched instructions are sent from the IFU 402 to the intermediate unit 420. The intermediate unit 420 includes logic and pipeline registers for decoding fetched instructions, renaming operand identifiers, performing dependency checking between instructions, and arbitrating among instructions for issue to corresponding execution units for executing the instructions based on command type of the instructions. The intermediate unit 420 is coupled to a working register file 410. It is noted that the illustrated embodiment is merely one example of how processor core 400 is implemented. In other embodiments, processor core 400 includes other components and interfaces not shown in FIG. 4. Alternative configurations and variations are possible and contemplated.

As shown, the LSU 424 is coupled to the cache controller 427, which transfers messages, memory requests, and memory responses with data cache 430. The cache controller 403 within the IFU 402 transfers messages, memory requests, and memory responses with instruction cache 404, and similarly, the cache controller 440 transfers messages, memory requests, and memory responses with the cache 442. The cache controller 427 includes the miss queue 428 and merge logic 429. Similarly, the cache controller 403 includes the miss queue 407 and merge logic 408. In some embodiments, the cache controllers 403 and 427 include multiple miss queues. In various embodiments, the miss queues 407 and 428 have the equivalent functionality of the miss queues 334 (of FIG. 3) and the merge logic 408 and 429 have the equivalent functionality of the control logic 320 (of FIG. 3). Accordingly, the functionality of the cache controllers 403 and 427 is equivalent to the functionality of the cache controller 300 (of FIG. 3). In some embodiments, the cache controller 440 also includes one or more miss queues and merge logic, and has the equivalent functionality of the cache controller 300.

The reorder buffer 416 is coupled to IFU 402, the working register file 410, and the outputs of any number of instruction execution resources for supporting out-of-order instruction execution within the intermediate unit 420. In an embodiment, each of the instruction cache 404 and the data cache 430 are level-one (L1) caches of a cache memory hierarchical subsystem. In such an embodiment, the cache 442, if present, is a level-two (L2) data cache and the cache controller 440 is a level-two (L2) cache controller. In some embodiments, the level-one (L1) caches 404 and 430 are at the highest level in the cache memory hierarchy and directly connected to the processor 400. As shown, the level-two (L2) cache 442 is one level lower from the L1 caches 404 and 430 in the cache memory hierarchy.

In various embodiments, the IFU 402 also includes the branch predictor 406. In various embodiments, the IFU 402 also includes a return address stack (not shown). IFU 402 also includes a number of data structures in addition to those shown such as an instruction translation lookaside buffer (ITLB), instruction buffers, and/or other structures configured to store state that is relevant to thread selection and processing (in multi-threaded embodiments of processor 400).

In various embodiments, IFU 402 uses the upper-level cache controller 403 to fetch instructions from upper-level instruction cache 404 and buffer them for downstream processing by the intermediate unit 420. In the illustrated embodiment, processor core 400 includes a working register file 410 that stores instruction results (e.g., integer results, floating-point results, and/or condition signature results) that have not yet been committed to architectural state, and which serve as the source for certain operands. Load store unit (LSU) 424 processes data memory references, such as integer and floating-point load and store instructions and other types of memory reference instructions. In an embodiment, LSU 424 interfaces with the upper-level cache controller 427 to access requested data stored in one of the data cache 430, the lower-level cache 442 (if available) and external memory.

The upper-level cache controller 427 includes logic for detecting data cache misses and to responsively request data from the lower-level cache controller 440. The upper-level cache controller 403 and the lower-level cache controller 440 includes similar components and logic as the upper-level cache controller 427. In various embodiments, the cache controller 427 includes merge logic 429 for merging multiple non-cacheable load miss requests targeting a same address range (e.g., addresses corresponding to a single cache line) within the lower-level cache 442.

Based on one or more conditions, the merge logic 429 determines when to end merging of non-cacheable load miss requests targeting a particular address range and to issue a single merged miss request. An example of a first condition is a timer for an address range targeted by the second load miss request has reached a time threshold, or has measured that a threshold amount of time has elapsed. An example of a second condition is a number of load miss requests that have merged has reached a threshold number. In one embodiment, the threshold number is a value stored in a programmable configuration register. An example of a third condition is the size of the merged miss request has reached a maximum size threshold. In an embodiment, the maximum size threshold is the size of a cache line of the lower level of the cache memory hierarchy. In another embodiment, the maximum size threshold is the accumulated size of the threshold number of load miss requests merged in the single merged miss request.

For an issued single merged miss request, when the fill data returns, each of the multiple load miss requests corresponding to the single merged miss request obtains a copy of its requested data. In various embodiments, the merge logic 429 prevents any other load miss requests, which were not previously merged in the single miss request before it was issued, from obtaining a copy of data from the returned fill data. Continuing with other components of the processor core 400, completion unit 414 includes reorder buffer (ROB) 416 and coordinates transfer of speculative results into the architectural state of processor 400. Entries in ROB 416 are allocated in program order. Completion unit 414 includes other elements for handling completion/retirement of instructions and/or storing history including register values, etc. In some embodiments, speculative results of instructions are stored in ROB 416 before being committed to the architectural state of processor 400, and confirmed results are committed in program order. Entries in ROB 416 are marked as completed when their results are allowed to be written to the architectural state. Completion unit 414 also coordinates instruction flushing and/or replaying of instructions.

Figure 5:
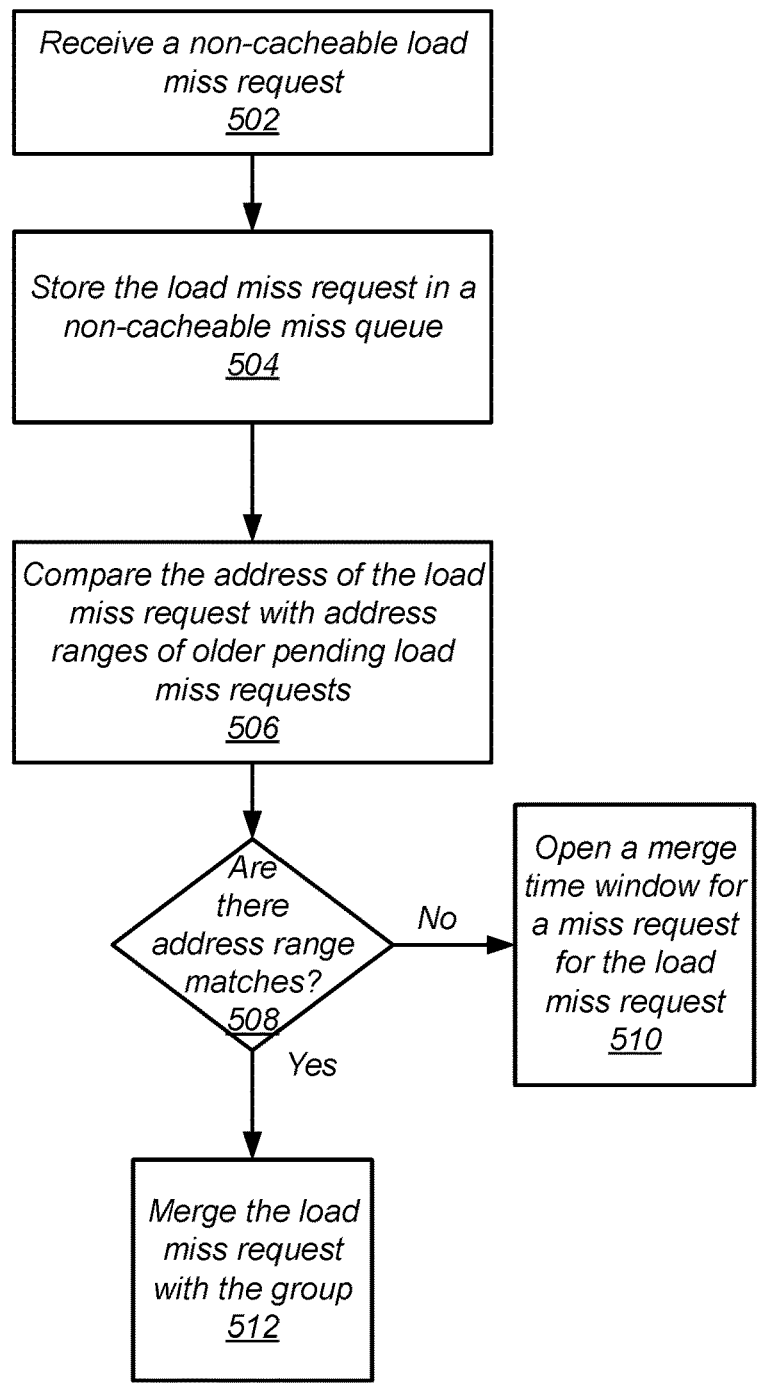
FIG. 5 is a flow diagram of one embodiment of a method for efficiently forwarding cache misses to another level of the hierarchy.

Turning now to FIG. 5, a generalized flow diagram of one embodiment of a method 500 for efficiently forwarding cache misses to another level of the hierarchy is shown. Logic of a cache controller receives a non-cacheable load miss request (block 502). The logic stores the load miss request in a non-cacheable miss queue (block 504). The logic determines whether the load miss request is a candidate to merge with older pending load miss requests corresponding to any open merge windows. In an embodiment, the logic compares the target address of the load miss request with target address ranges of older pending load miss requests corresponding to open merge windows (block 506). If the logic determines that there are no matches with the target address ranges ("no" branch of the conditional block 508), then the logic "opens" a merge window for the load miss request (block 510). In other words, the logic sets a state of the merge window with an open state instead of a closed state. An open state of a merge window indicates additional load miss requests may be merged with load miss requests corresponding to the merge window. A closed state of a merge window indicates no additional load miss requests may merge with load miss requests corresponding to the merge window. At this time, the single merged miss request for the recently opened merge window only includes the load miss request. Further steps by the logic are described in the upcoming method 600 (of FIG. 6).

If the logic determines that there are matches with the address ranges ("yes" branch of the conditional block 508), then the logic merges the load miss request with the group (block 512). In some embodiments, the In addition, in some embodiments, the logic updates a size of requested data within the single merged miss request based on the size of requested data of the load miss request. In other embodiments, the logic updates the size of requested data within the single merged miss request based on a size of requested data of the load miss request that does not overlap with the already requested data of the single merged miss request. For example, if the load miss request targets a least significant 16 bytes of a cache line of a lower-level cache, and the one or more load miss requests of the single merged miss request already targets the least significant 8 bytes and an additional 16 bytes in the middle of a 64-byte cache line, then the logic updates the size of requested data of the single merged miss request by 8 additional bytes.

Figure 6:
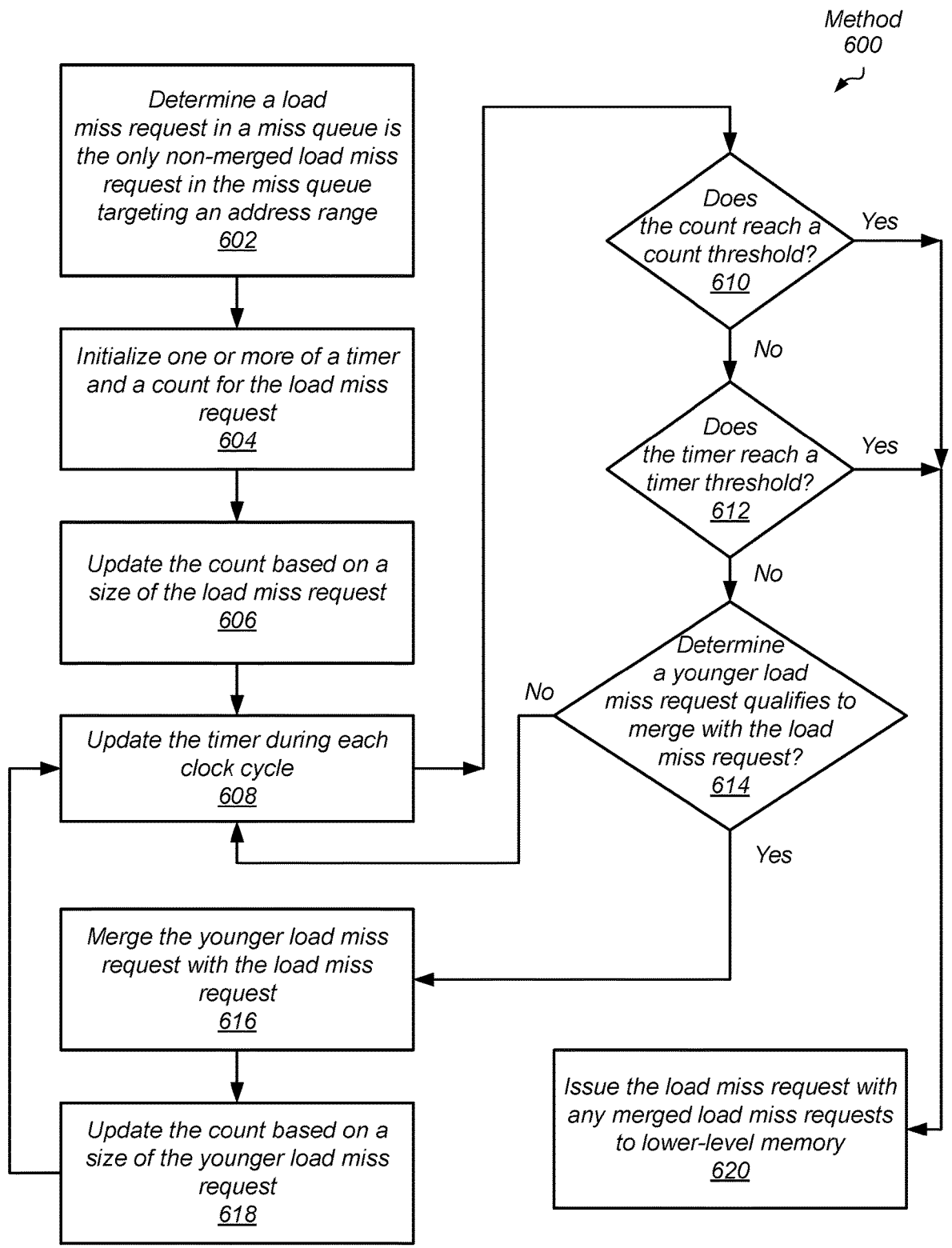
FIG. 6 is a flow diagram of one embodiment of a method for efficiently forwarding cache misses to another level of the hierarchy.

Turning now to FIG. 6, a generalized flow diagram of one embodiment of a method 600 for efficiently forwarding cache misses to another level of a memory system hierarchy is shown. In the example shown, logic determines a load miss request in a miss queue is the only non-merged load miss request in the miss queue targeting an address range (or targeted cache line) with no open merge window (block 602). For example, such a determination may be made when the request is stored in the miss queue. In various embodiments, the load miss request is a non-cacheable load miss request. Responsive to such a determination, the logic creates an open merge window for the load miss request, and initializes one or more of a timer and a size count for the load miss request (block 604).

The logic updates the size count based on a size of the load miss request (block 606). For example, in some embodiments the logic maintains a size count of units within an address range that correspond to a miss request. In various embodiments, the number of units corresponds to the minimum amount of data that a load can access in a cache line. For example, in one embodiment a cache line has a size of 64 bytes and the minimum accessible unit is 8 bytes. Therefore, an 8-byte load would access one unit, a 16-byte load would access 2 units, and so on. In some embodiments, the address range corresponds to a cache line in a lower-level cache memory hierarchy.

In various embodiments, the logic updates the time periodically (e.g., once each clock cycle) (block 608). If the logic determines that the count has reached a count threshold ("yes" branch of the conditional block 610), then the logic has determined that the merge window has closed and merging of additional requests with the load miss ceases. Control flow of method 600 moves to block 620 where the logic issues the load miss request with any already merged load miss requests to lower-level memory. If the logic determines the count has not yet reached a count threshold ("no" branch of the conditional block 610), but the logic determines the timer for the load miss request has reached a time threshold ("yes" branch of the conditional block 612), then the period of time for merging additional requests with the load miss has expired and control flow of method 600 moves to block 620 where the logic issues the load miss request with any merged load miss requests to lower-level memory. It is noted that while steps 610 and 612 are shown in a particular sequence, in other embodiments their order may be reversed or they may be performed concurrently.

If the logic determines the timer for the load miss request has not reached a time threshold ("no" branch of the conditional block 612), and the logic determines no younger load miss request qualifies to merge with the load miss request ("no" branch of the conditional block 614), then control flow of method 600 returns to block 608. If the logic determines one or more younger load miss requests qualify to merge with the load miss request ("yes" branch of the conditional block 614), then the logic merges the one or more younger load miss requests with the load miss request with an open merge window (block 616). For example, the logic may store an indication that the one or more younger load miss requests are to be included in the single, merged, miss request for the load miss request. The logic then updates the count based on a size of the one or more younger load miss requests (block 618).

Figure 7:
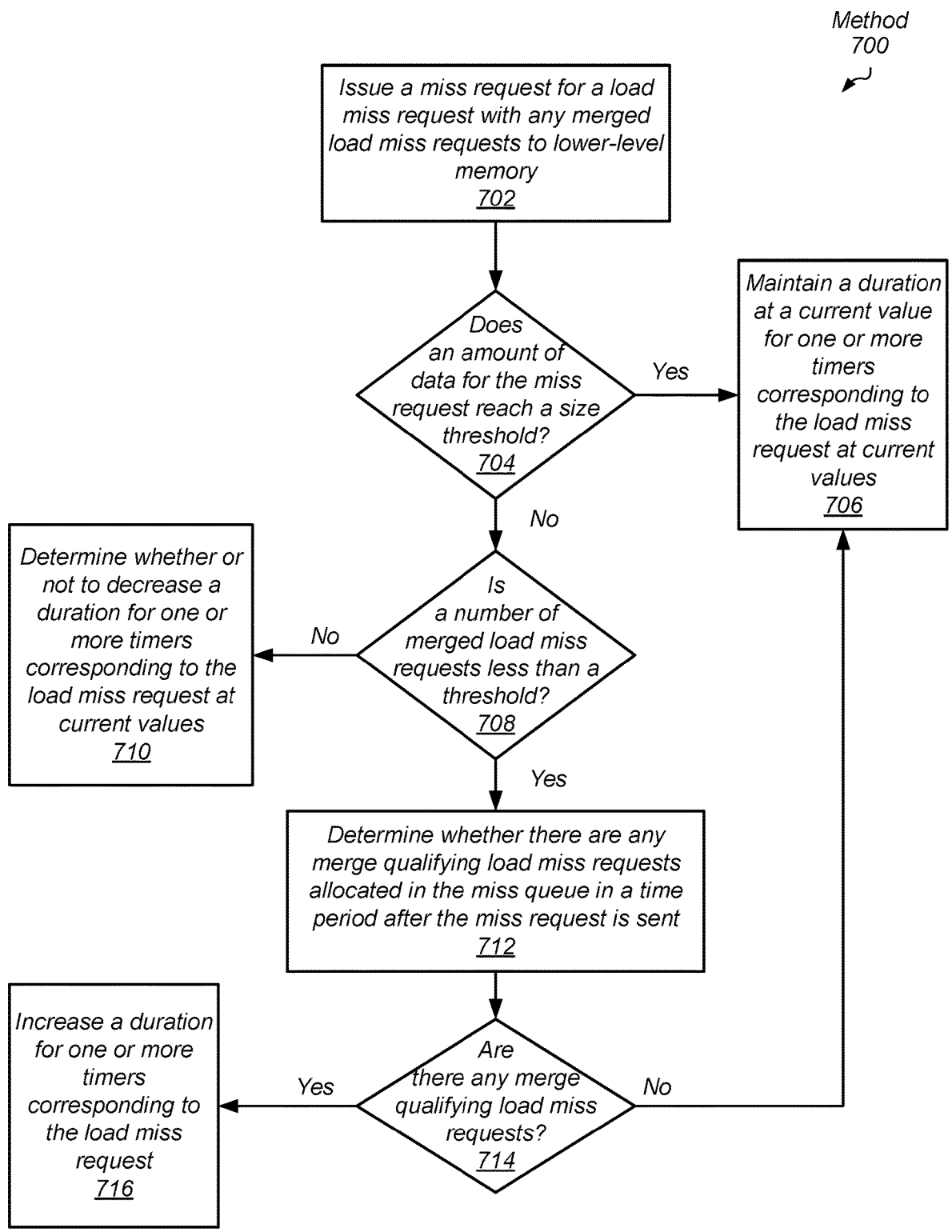
FIG. 7 is a flow diagram of one embodiment of a method for efficiently forwarding cache misses to another level of the hierarchy.

Referring now to FIG. 7, a generalized flow diagram of one embodiment of a method 700 for efficiently forwarding cache misses to another level of the hierarchy is shown. Logic for a cache controller issues a miss request for a load miss request with any merged load miss requests to lower-level memory (block 702). In some embodiments, the logic maintains an amount of requested data for the miss request, which may be a single merged miss request. As described earlier, in some embodiments, the logic maintains a count. In other embodiments, the logic maintains an absolute size. If the logic determines that the amount of requested data for the miss requests reaches a size threshold ("yes" branch of the conditional block 704), then the logic maintains a duration at a current value for one or more timers corresponding to the load miss request (block 706).

If the logic determines that the amount of requested data for the miss requests does not reach the size threshold ("no" branch of the conditional block 704), and the number of merged load miss requests is greater than or equal to a threshold ("no" branch of the conditional block 708), then the logic determines whether or not to decrease a duration for one or more timers corresponding to the load miss request at current values (block 710). The further steps for this determination is described in the upcoming method 800 (of FIG. 8). If the logic determines that the number of merged load miss requests is less than the threshold ("yes" branch of the conditional block 708), then the logic determines whether there are any merge qualifying load miss requests allocated in the miss queue in a time period after the miss request is sent (block 712). As described earlier regarding the control logic 320 (of FIG. 3), in some embodiments, the time period is a duration between a point in time when the miss request is issued and a point in time when the fill data for the miss request arrives at the cache controller. If there are any merge qualifying load miss requests allocated in the miss queue ("yes" branch of the conditional block 714), then the logic increases a duration for one or more timers corresponding to the load miss request (block 716). Otherwise, control flow of method 700 moves to block 706 where the logic maintains a duration at a current value for one or more timers corresponding to the load miss request.

Figure 8:
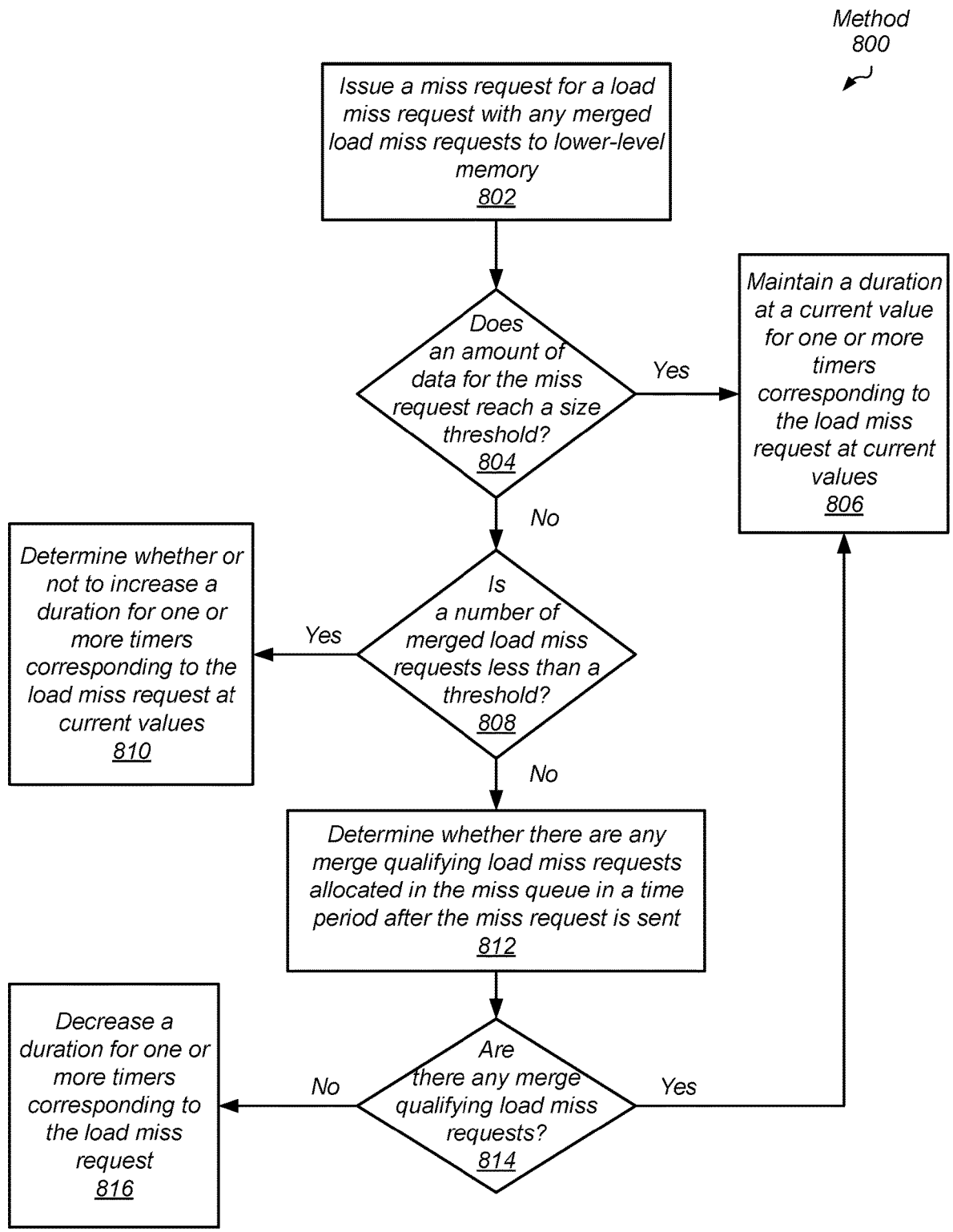
FIG. 8 is a flow diagram of one embodiment of a method for efficiently forwarding cache misses to another level of the hierarchy.

Turning now to FIG. 8, a generalized flow diagram of one embodiment of a method 800 for efficiently forwarding cache misses to another level of the hierarchy is shown. Logic for a cache controller issues a miss request for a load miss request with any merged load miss requests to lower-level memory (block 802). If the logic determines that the amount of requested data for the miss requests reaches a size threshold ("yes" branch of the conditional block 804), then the logic maintains a duration at a current value for one or more timers corresponding to the load miss request (block 806).

If the logic determines that the amount of requested data for the miss requests does not reach the size threshold ("no" branch of the conditional block 804), and the number of merged load miss requests is less than a threshold ("yes" branch of the conditional block 808), then the logic determines whether or not to increase a duration for one or more timers corresponding to the load miss request at current values (block 810). The further steps for this determination were described in the previous method 700 (of FIG. 7).

If the logic determines that the number of merged load miss requests is greater than or equal to the threshold ("no" branch of the conditional block 808), then the logic determines whether there are any merge qualifying load miss requests allocated in the miss queue in a time period after the miss request is sent (block 812). If there are no merge qualifying load miss requests allocated in the miss queue ("no" branch of the conditional block 814), then the logic decreases a duration for one or more timers corresponding to the load miss request (block 816). Otherwise, control flow of method 800 moves to block 806 where the logic maintains a duration at a current value for one or more timers corresponding to the load miss request.

It is noted that there is a tradeoff between delaying issue of a miss request, in hopes of merging further load miss requests into a single request, and issuing the miss request as soon as possible. The performance benefit of the two approaches is typically based on the behavior and/or types of tasks of the software application(s) being processed in addition to the type of hardware processing the software application(s). Regardless of these factors, though, the methods 700 and 800 provide steps to determine which approach is more beneficial as the software application(s) are processed and dynamically adjust the amount of merging performed.

Figure 9:
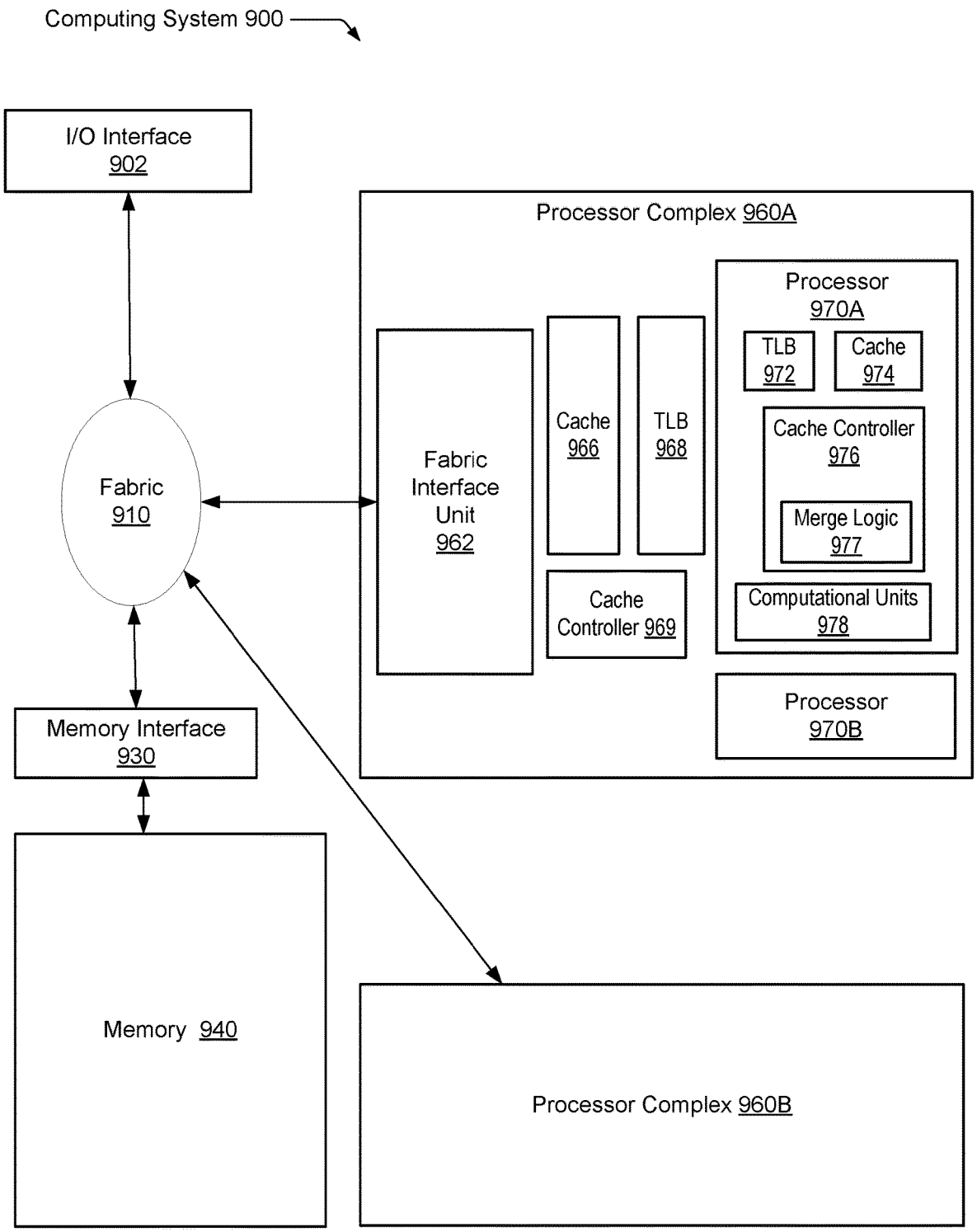
FIG. 9 is a block diagram of one embodiment of a computing system.

Referring to FIG. 9, a generalized block diagram of one embodiment of a computing system 900 is shown. As shown, a communication fabric 910 routes traffic between the input/output (I/O) interface 902, the memory interface 930, and the processor complexes 960A-960B. In various embodiments, the computing system 900 is a system on chip (SoC) that includes multiple types of integrated circuits on a single semiconductor die, each integrated circuit providing a separate functionality. In other embodiments, the multiple functional units are individual dies within a package, such as a multi-chip module (MCM). In yet other embodiments, the multiple functional units are individual dies or chips on a printed circuit board.

Clock sources, such as phase lock loops (PLLs), interrupt controllers, power managers, and so forth are not shown in FIG. 9 for ease of illustration. It is also noted that the number of components of the computing system 900 (and the number of subcomponents for those shown in FIG. 9, such as within each of the processor complexes 960A-960B) vary from embodiment to embodiment. The term "processor complex" is used to denote a configuration of one or more processor cores using local storage, such as a shared cache memory subsystem, and capable of processing a workload together.

In various embodiments, different types of traffic flows independently through the fabric 910. The independent flow is accomplished by allowing a single physical fabric bus to include a number of overlaying virtual channels, or dedicated source and destination buffers, each carrying a different type of traffic. Each channel is independently flow controlled with no dependence between transactions in different channels. The fabric 910 may also be packet-based, and may be hierarchical with bridges, cross bar, point-to-point, or other interconnects.

In some embodiments, the memory interface 930 uses at least one memory controller and at least one cache for the off-chip memory, such as synchronous DRAM (SDRAM). The memory interface 930 stores memory requests in request queues, uses any number of memory ports, and uses circuitry capable of interfacing to memory 940 using one or more of a variety of protocols used to interface with memory channels used to interface to memory devices (not shown). In various embodiments, one or more of the memory interface 930, an interrupt controller (not shown), and the fabric 910 uses control logic to ensure coherence among the different processor complexes 960A-960B and peripheral devices.

Memory 940 stores one or more applications. In an example, a copy of at least a portion of an application is loaded from memory 940 into an instruction cache in one of the processors 970A-970B when the application is selected by a base operating system (OS) for execution. Alternatively, a virtual (guest) OS (not shown) selects the application for execution. Memory 940 stores a copy of the base OS and copies of portions of the base OS are executed by one or more of the processors 970A-970B. Memory 940 also stores source data for applications in addition to result data and intermediate data generated during the execution of applications.

A virtual address space for the data stored in memory 940 and used by a software process is typically divided into pages of a prefixed size. The virtual pages are mapped to frames of physical memory. The mappings of virtual addresses to physical addresses where virtual pages are loaded in the physical memory are stored in page table 950. Each of translation look-aside buffers (TLBs) 968 and 972 stores a subset of page table 950.

In some embodiments, the components 962-978 of the processor complex 960A are similar to the components in the processor complex 960B. In other embodiments, the components in the processor complex 960B are designed for lower power consumption, and therefore, include control logic and processing capability producing less performance. For example, supported clock frequencies may be less than supported clock frequencies in the processor complex 960A. In addition, one or more of the processors in processor complex 960B may include a smaller number of execution pipelines and/or functional blocks for processing relatively high power consuming instructions than what is supported by the processors 970A-970B in the processor complex 960A.

As shown, processor complex 960A uses a fabric interface unit (FIU) 962 for providing memory access requests and responses to at least the processors 970A-970B. Processor complex 960A also supports a cache memory subsystem, which includes at least cache 966. In some embodiments, the cache 966 is a shared off-die level two (L2) cache for the processors 970A-970B although an L3 cache is also possible and contemplated. In various embodiments, the processor complex 960A does not actually include the off-die cache 966 and the cache controller 969 still supports servicing memory requests from the cache controller 976. In various embodiments, the functionality of one or more of the cache controllers 969 and 976 are equivalent to the functionality of the cache controller 300 (of FIG. 3). For example, cache controller 976 is shown with merge logic 977, which in several embodiments, has the equivalent functionality of control logic 320 and timers 336 (of FIG. 3).

In some embodiments, the processors 970A-970B use a homogeneous architecture. For example, each of the processors 970A-970B is a general-purpose processor, such as a central processing unit (CPU), which utilizes circuitry for executing instructions according to a predefined general-purpose instruction set. Any of a variety of instruction set architectures (ISAs) is selected. In some embodiments, each core within processors 970A-970B supports the out-of-order execution of one or more threads of a software process and include a multi-stage pipeline. In other embodiments, one or more of the processors 970A-970B supports in-order execution of instructions. The processors 970A-970B may support the execution of a variety of operating systems.

In other embodiments, the processors 970A-970B use a heterogeneous architecture. In such embodiments, one or more of the processors 970A-970B is a highly parallel data architected processor, rather than a CPU. In some embodiments, these other processors of the processors 970A-970B use single instruction multiple data (SIMD) cores. Examples of SIMD cores are graphics processing units (GPUs), digital signal processing (DSP) cores, or otherwise.

In various embodiments, each one of the processors 970A-970B uses one or more cores and one or more levels of a cache memory subsystem. The processors 970A-970B use multiple one or more on-die levels (L1, L2, L3 and so forth) of caches for accessing data and instructions. If a requested block is not found in the on-die caches or in the off-die cache 966, then a read request for the missing block is generated and transmitted to the cache controller 969. The cache controller 969 is capable of transmitted memory requests to the memory 940 via the memory interface 930 and fabric 910. When application 944 is selected for execution by processor complex 970A, a copy of the selected application is retrieved from memory 940 and stored in cache 974. In various embodiments, each of processor complexes 960A-960B utilizes linear addresses (virtual addresses) when retrieving instructions and data from caches 974 and 966 while processing applications.

Figure 10:
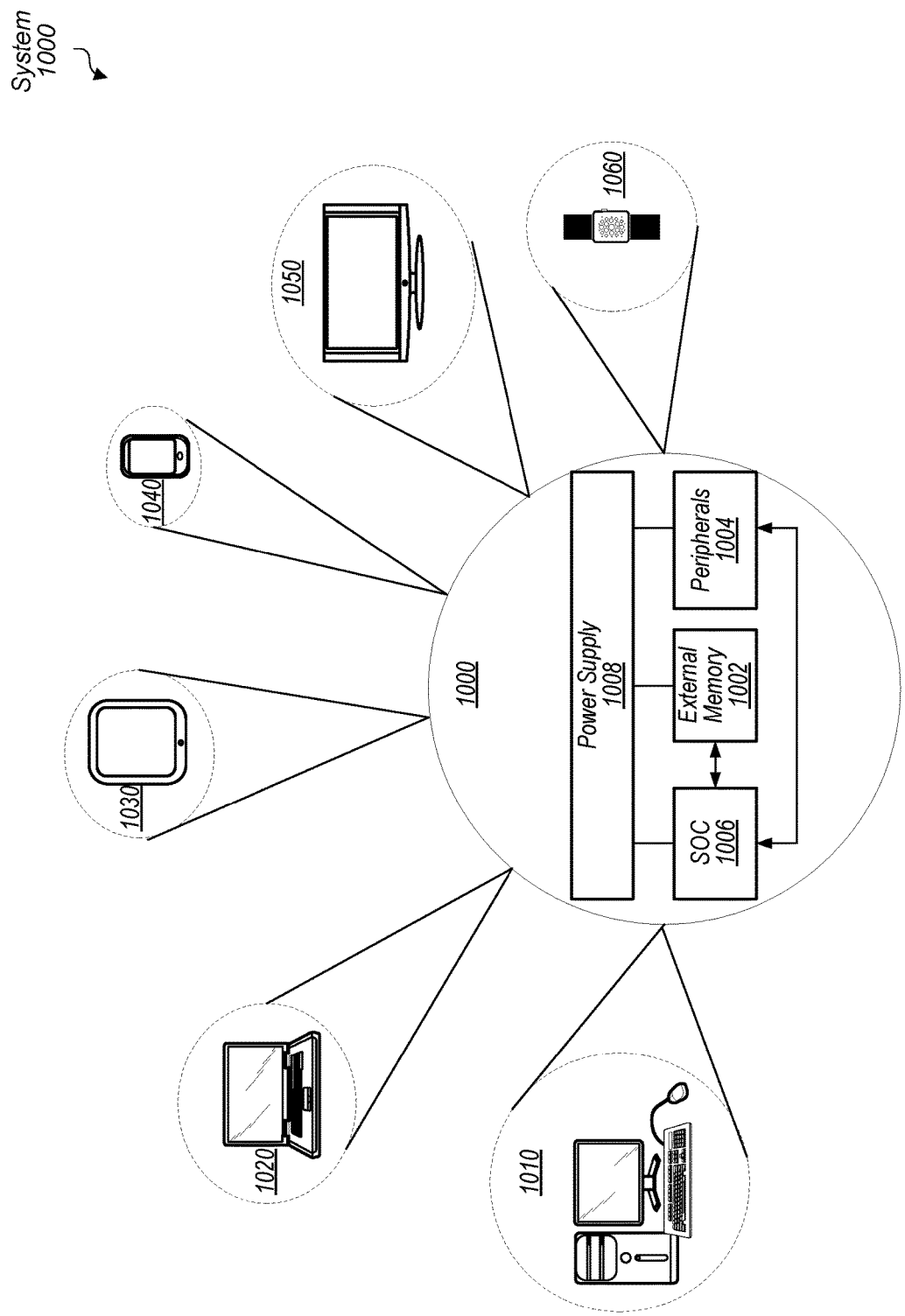
FIG. 10 is a block diagram of one embodiment of a system.

Turning next to FIG. 10, a block diagram of one embodiment of a system 1200 is shown. As shown, system 1000 represents chip, circuitry, components, etc., of a desktop computer 1010, laptop computer 1020, tablet computer 1030, cell or mobile phone 1040, television 1050 (or set top box coupled to a television), wrist watch or other wearable item 1060, or otherwise. Other devices are possible and are contemplated. In the illustrated embodiment, the system 1000 includes at least one instance of a system on chip (SoC) 1006 which includes multiple processors and a communication fabric. In some embodiments, SoC 1006 includes components similar to cache controller 300 (of FIG. 3) for efficiently forwarding cache misses to another level of the cache memory hierarchy. In various embodiments, SoC 1006 is coupled to external memory 1002, peripherals 1004, and power supply 1008.

A power supply 1008 is also provided which supplies the supply voltages to SoC 1006 as well as one or more supply voltages to the memory 1002 and/or the peripherals 1004. In various embodiments, power supply 1008 represents a battery (e.g., a rechargeable battery in a smart phone, laptop or tablet computer). In some embodiments, more than one instance of SoC 1006 is included (and more than one external memory 1002 is included as well).

The memory 1002 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices are coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

The peripherals 1004 include any desired circuitry, depending on the type of system 1000. For example, in one embodiment, peripherals 1004 includes devices for various types of wireless communication, such as Wi-Fi, Bluetooth, cellular, global positioning system, etc. In some embodiments, the peripherals 1004 also include additional storage, including RAM storage, solid-state storage, or disk storage. The peripherals 1004 include user interface devices such as a display screen, including touch display screens or multi-touch display screens, keyboard or other input devices, microphones, speakers, etc.

In various embodiments, program instructions of a software application may be used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computer during use to provide the program instructions and accompanying data to the computer for program execution. In some embodiments, a synthesis tool reads the program instructions in order to produce a netlist including a list of gates from a synthesis library.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
a first interface configured to communicate with a cache controller;
a miss queue comprising a plurality of queue entries, wherein one or more of the plurality of queue entries are configured to store information corresponding to a load miss; and
circuitry configured to:
store a first load miss request received via the first interface in the miss queue;
receive a second load miss request;
determine whether a first merge window corresponding to the first load miss request is in:
an open state indicating additional load miss requests may be merged with the first load miss request; or
a closed state indicating no additional load miss requests may merge with the first load miss request; and
merge the second load miss request with the first load miss request into a single merged miss request in response to:
a first determination that the first merge window is in the open state; and
a second determination, different from the first determination, that the second load miss request qualifies to be merged with the first load miss request;
issue the single merged miss request to a lower level memory.

2. The apparatus as recited in claim 1, wherein the circuitry is further configured to open the first merge window corresponding to the first load miss request based at least in part on:
an allocation of the first load miss request in the miss queue; and
a determination that the first load miss request does not merge with any older pending load miss requests corresponding to any open merge windows.

3. The apparatus as recited in claim 2, wherein the first merge window corresponds to at least one of a period of time and a size of data requested by the single merged miss request.

4. The apparatus as recited in claim 3, wherein the circuitry is configured to close the first merge window based at least in part on a determination that at least one of:
the period of time has expired; and
the size of the data has reached a threshold.

5. The apparatus as recited in claim 4, wherein the circuitry is configured to update the size of data requested by the single merged miss request based on an amount of data requested by miss requests merged into the single merged miss request.

6. The apparatus as recited in claim 2, wherein the circuitry is configured to open the first merge window based at least in part on a determination that the first load miss request corresponds to a non-cacheable request.

7. The apparatus as recited in claim 4, wherein the circuitry is configured to issue the single merged miss request based at least in part on a determination that the first merge window has closed.

8. The apparatus as recited in claim 1, wherein the circuitry is configured to merge the second load miss request with the first load miss request in based at least in part on a determination that:
    an address of the second load request is within an address range of the first load miss request.

9. A method, comprising:
    communicating, via a first interface, with a cache controller;
    storing, in one or more queue entries of a plurality of queue entries of a miss queue, information corresponding to a load miss;
    receiving, via the first interface, a first load miss request;
    storing, by logic, the first load miss request in the miss queue;
    receiving, via the first interface, a second load miss request;
    determining, by the logic, whether a first merge window corresponding to the first load miss request is in:
        an open state indicating additional load miss requests may be merged with the first load miss request; or
        a closed state indicating no additional load miss requests may merge with the first load miss request; and
    merging, by the logic, the second load miss request with the first load miss request into a single merged miss request in response to:
        a first determination that the first merge window is in the open state; and
        a second determination, different from the first determination, that the second load miss request qualifies to be merged with the first load miss request;
    issuing, by the logic, the single merged miss request to a lower level memory.

10. The method as recited in claim 9, further comprising opening the first merge window corresponding to the first load miss request responsive to:
    allocating the first load miss request in the miss queue; and
    determining the first load miss request does not merge with any older pending load miss requests corresponding to any open merge windows.

11. The method as recited in claim 10, wherein the first merge window corresponds to at least one of a period of time and a size of data requested by the single merged miss request.

12. The method as recited in claim 11, further comprising closing the first merge window responsive to determining at least one of:
    the period of time has expired; and
    the size of the data has reached a threshold.

13. The method as recited in claim 12, further comprising updating the size of data requested by the single merged miss requests based on an amount of data requested by miss requests merged into the single merged miss request.

14. The method as recited in claim 12, further comprising opening the first merge window in response to determining the first load miss request corresponds to a non-cacheable request.

15. A non-transitory computer readable storage medium storing program instructions, wherein the program instructions are executable by a processor to:
    communicate with a cache controller;
    store in one or more queue entries of a plurality of queue entries of a miss queue, information corresponding to a load miss;
    receive a first load miss request;
    store the first load miss request in the miss queue;
    receive a second load miss request;
    determine whether a first merge window corresponding to the first load miss request is in:
        an open state indicating additional load miss requests may be merged with the first load miss request; or
        a closed state indicating no additional load miss requests may merge with the first load miss request; and
    merge the second load miss request with the first load miss request into a single merged miss request in response to:
        a first determination that the first merge window is in the open state; and
        a second determination, different from the first determination, that the second load miss request qualifies to be merged with the first load miss request;
    issue the single merged miss request to a lower level memory.

16. The non-transitory computer readable storage medium as recited in claim 15, wherein the program instructions are executable by a processor to open the first merge window corresponding to the first load miss request based at least in part on:
    an allocation of the first load miss request in the miss queue; and
    a determination that the first load miss request does not merge with any older pending load miss requests corresponding to any open merge windows.

17. The non-transitory computer readable storage medium as recited in claim 16, wherein the first merge window corresponds to at least one of a period of time and a size of data requested by the single merged miss request.

18. The non-transitory computer readable storage medium as recited in claim 17, wherein the program instructions are executable by a processor to close the first merge window based at least in part on a determination that at least one of:
    the period of time has expired; and
    the size of the data has reached a threshold.

19. The non-transitory computer readable storage medium as recited in claim 16, wherein the program instructions are executable by a processor to open the first merge window based at least in part on a determination that the first load miss request corresponds to a non-cacheable request.

20. The non-transitory computer readable storage medium as recited in claim 18, wherein the program instructions are executable by a processor to issue the single merged miss request based at least in part on a determination that the first merge window has closed.

* * * * *

UNITED STATES PATENT AND TRADEMARK OFFICE
CERTIFICATE OF CORRECTION

PATENT NO. : 11,099,990 B2
APPLICATION NO. : 16/545521
DATED : August 24, 2021
INVENTOR(S) : Levinsky et al.

Page 1 of 1

It is certified that error appears in the above-identified patent and that said Letters Patent is hereby corrected as shown below:

In the Claims

Column 19, Claim 8, Line 7, please delete "in based" and insert -- based --.

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*